United States Patent [19]
Cirino

[11] 3,991,433
[45] Nov. 16, 1976

[54] BLOWER EQUIPMENT FOR ROLL-OVER CAR WASH

[76] Inventor: John F. Cirino, Box 191, Southampton, Pa. 18966

[22] Filed: May 16, 1974

[21] Appl. No.: 470,599

Related U.S. Application Data

[62] Division of Ser. No. 343,869, March 22, 1973, Pat. No. 3,877,107.

[52] U.S. Cl. .............................. 15/312 R; 15/316 R; 15/405; 34/243 C
[51] Int. Cl.[2] ........................ A47L 5/38; B60S 3/06
[58] Field of Search ................. 15/302, 312 R, 405, 15/316 R; 34/243 C

[56] References Cited
UNITED STATES PATENTS

| | | | |
|---|---|---|---|
| 2,904,894 | 9/1959 | Hurst | 34/243 C X |
| 3,224,108 | 12/1965 | Flaming | 34/243 C X |
| 3,431,580 | 3/1969 | Cirino et al. | 15/302 |
| 3,442,027 | 5/1969 | Hurwitz | 15/405 X |
| 3,590,417 | 7/1971 | Emmanuel | 15/302 |

Primary Examiner—Christopher K. Moore
Attorney, Agent, or Firm—Synnestvedt & Lechner

[57] ABSTRACT

Roll-over car washing equipment is disclosed of the type having an inverted U-shaped frame adapted to travel over a car washing station and having air nozzles for directing drying air against the upwardly presented surfaces and also against the sides of the car in the washing station, the nozzles being supplied with air by one or more blowers mounted on the frame, with controllable means for alternatively delivering the air to the side nozzles and the top nozzle. The top nozzle is provided with mounting linkage providing for maximizing vertical movement of the nozzle while minimizing the dimension of the equipment lengthwise of the washing station.

2 Claims, 12 Drawing Figures

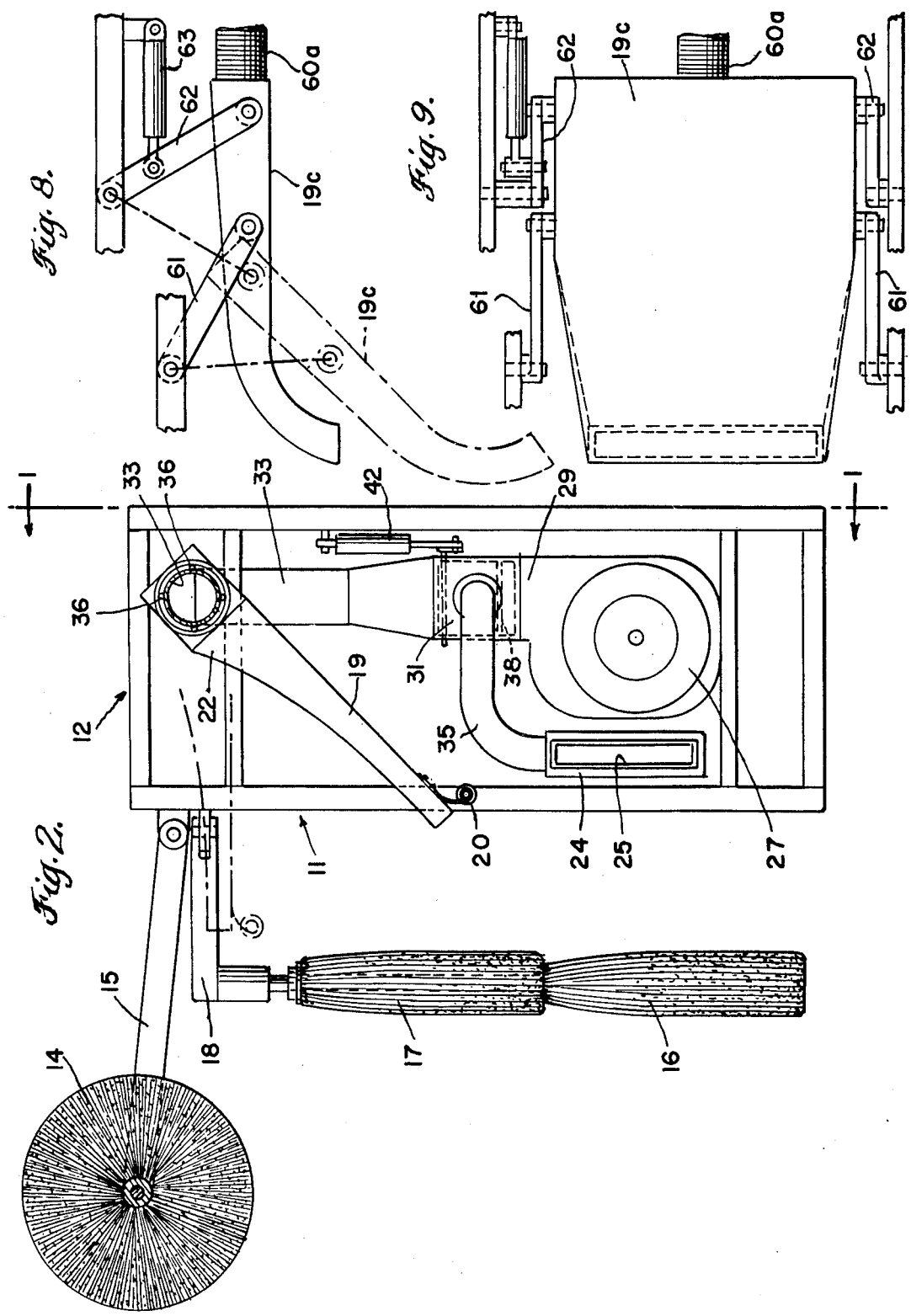

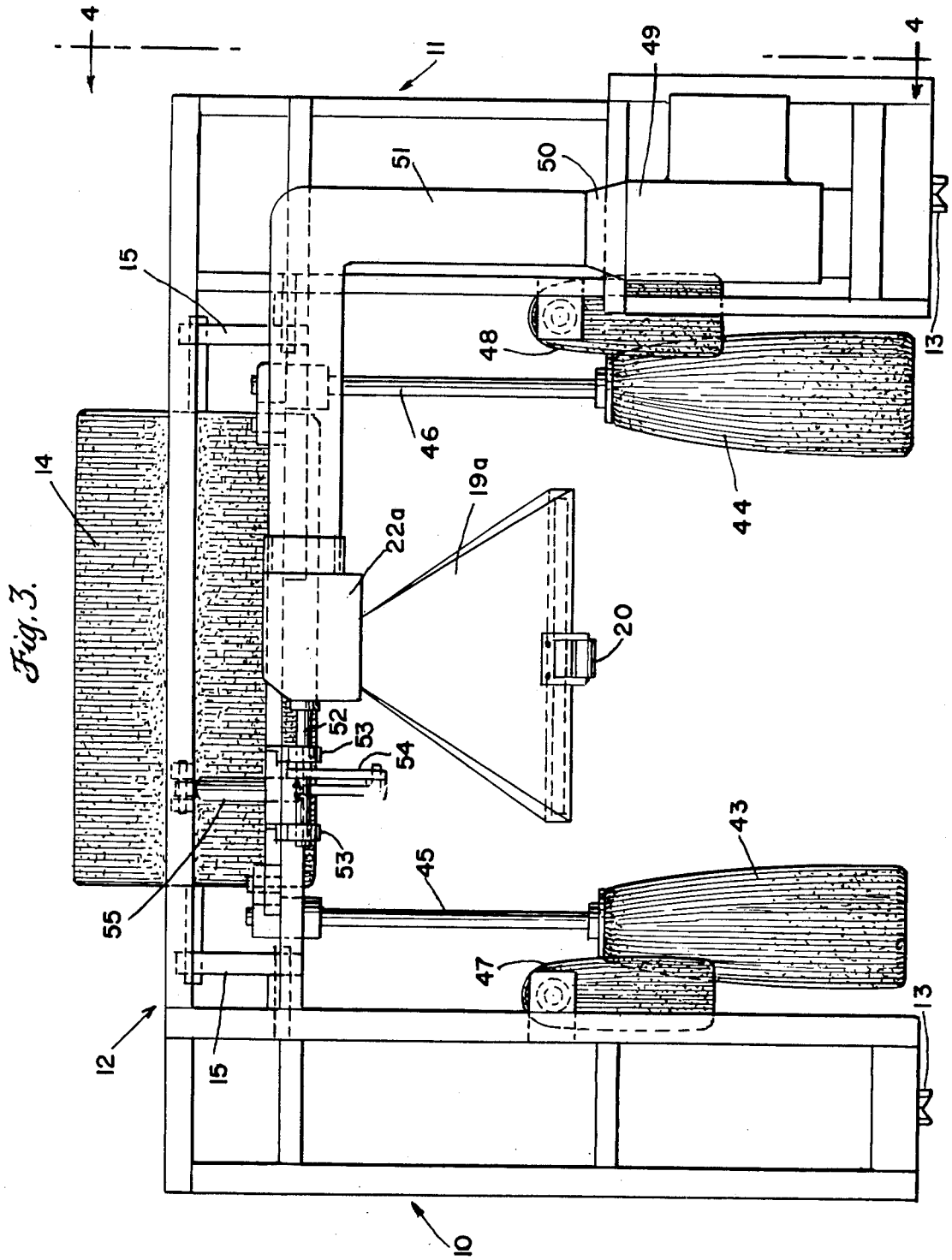

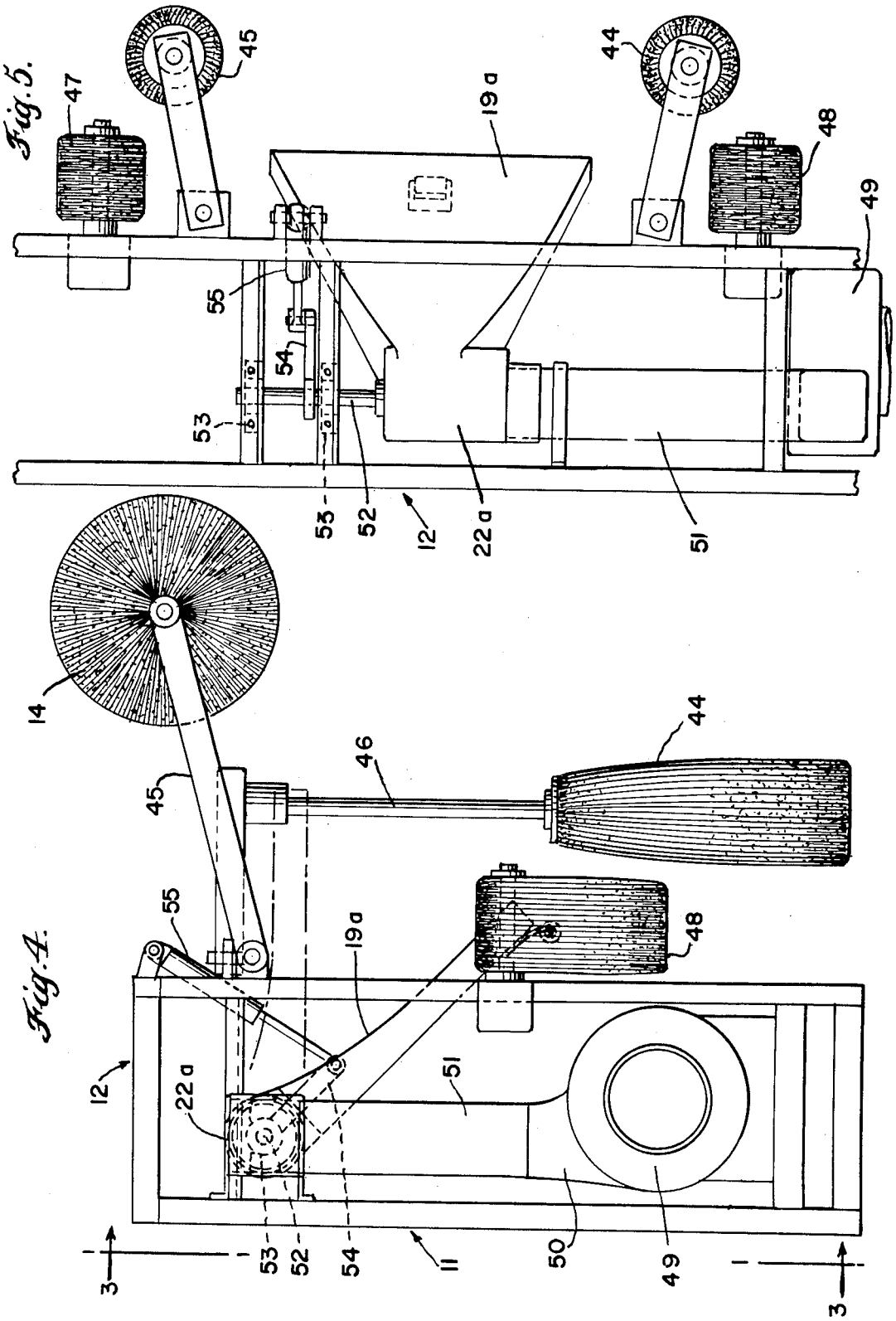

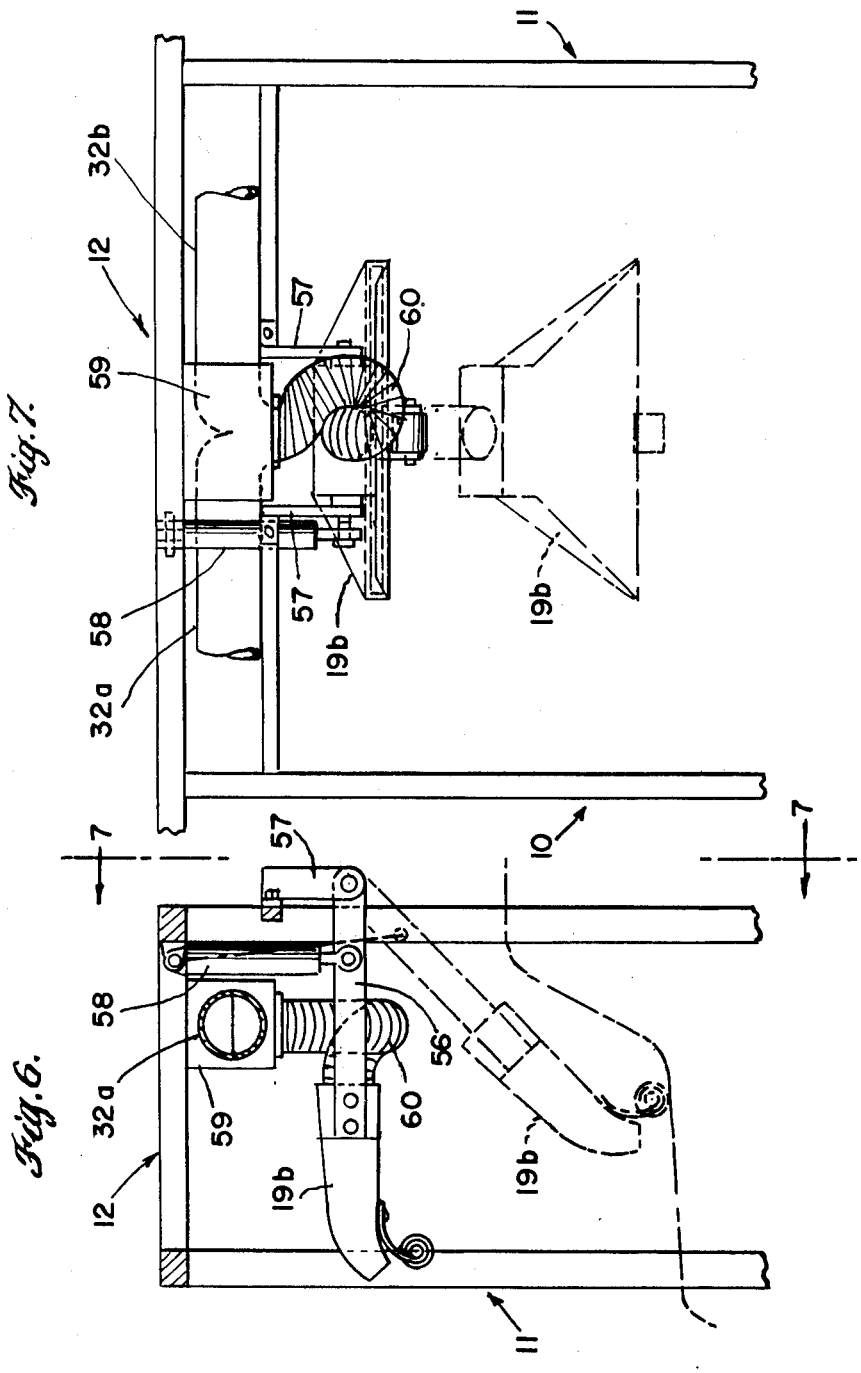

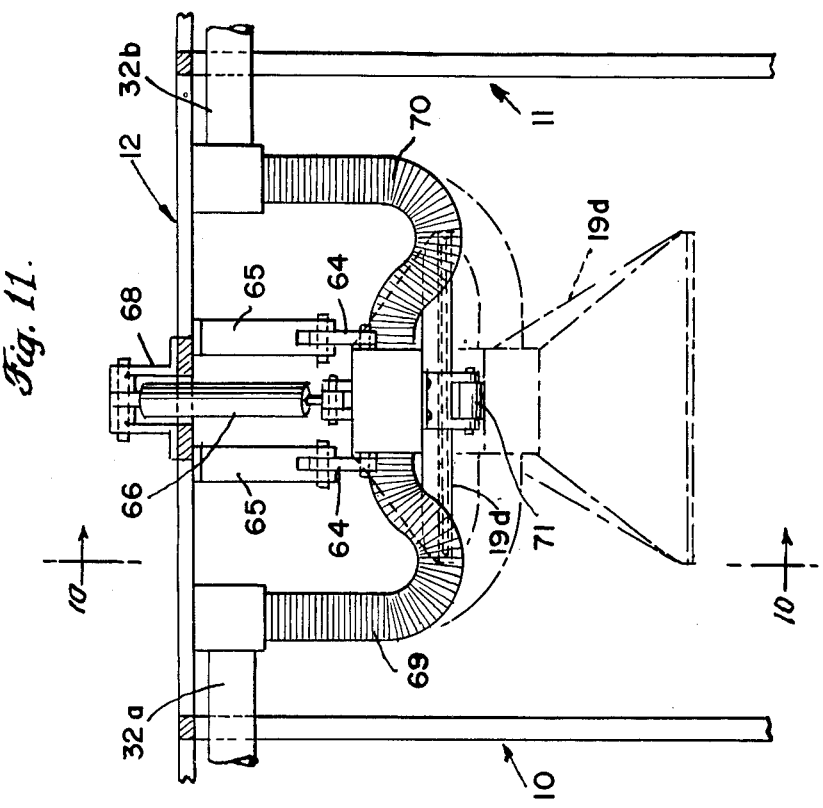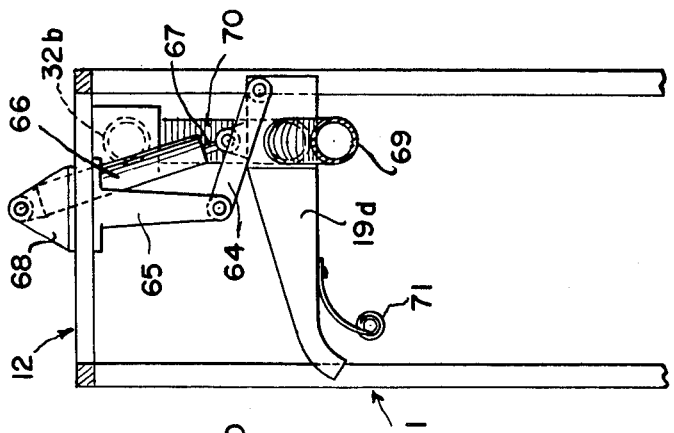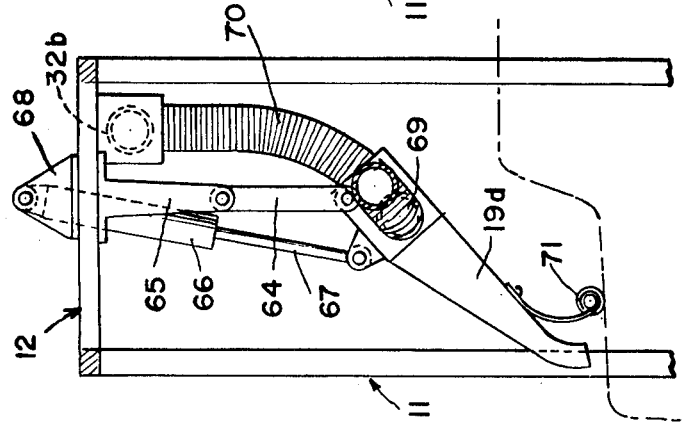

BLOWER EQUIPMENT FOR ROLL-OVER CAR WASH

This is a division of application Ser. No. 343,869, filed Mar. 22, 1973, now U.S. Pat. No. 3,877,107.

This invention relates to roll-over type car washing equipment especially of the kind comprising an inverted U-shaped frame having its legs mounted to travel on supporting rails at opposite sides of a car washing station. The equipment preferably includes top and side brushes and water supply means in order to effect scrubbing of both the upwardly presented and also the laterally presented surfaces of vehicles brought into washing positioning in the car washing station. In addition the equipment may include usual supply systems for detergent and wax.

The invention is primarily concerned with the provision of improved air drying means embodied in car washes of the kind equipped as just described.

Provision for air drying has been made in certain prior roll-over car washes, but various of these prior known arrangements have been subject to difficulties and disadvantages which the present invention overcomes.

For example, in certain prior arrangements a top nozzle for drying air has been provided and a single motor and blower unit for supplying air to the top nozzle has been arranged on or within the transverse frame structure supported at the top of the legs of the equipment. In an arrangement of this type it has not been practical to deliver air from the blower situated at the top to the two nozzles at the sides of the car, for various reasons including the complexity of the ducting which this would require, and in view of this, the delivery of air has been limited to the top nozzle only, with consequent inadequate drying of the side surfaces of the cars.

In addition, with prior arrangements in which a single motor blower unit has been mounted on the cross-piece of the frame structure above the car washing station, in order to provide adequate blower capacity it has been necessary to use a motor blower unit of quite large size and great weight and this is disadvantageous from several standpoints including the cost of the motor blower unit itself and also the fact that the location of the great weight of such a unit at the top of the roll-over structure has a tendency to make the equipment top heavy and thus decrease the stability thereof.

Other problems which have been encountered heretofore include the fact that the provision of a top blower nozzle in certain arrangements has a tendency to excessively increase the over-all width of the equipment, i.e., the dimensions of the equipment in the axial direction of travel of the equipment over the car washing station, with consequent necessity for increasing the length of the bay required for accommodation of the equipment. It is important that the equipment be arranged so that it may be mounted for the required traveling motion with respect to the car washing station in a bay of minimum of over-all length because this facilitates the installation of the equipment in many service stations and other facilities where the available space is restricted.

Still another difficulty which has been encountered heretofore is the fact that it has been difficult to arrange the air nozzles, notably the top nozzle in positions having the discharge orifice sufficiently close to the surface of the car being dried to effectively perform the drying function. Increase in the distance of the orifice from the surface to be dried necessarily requires increase in the capacity of the motor blower unit in order to provide effective drying action, and this, in turn, tends to increase both the cost and the weight of the motor blower units.

Having in mind all of the foregoing problems and disadvantages of certain prior art arrangements, the present invention contemplates certain new forms and arrangements of air drying equipment for roll-over car washes, which not only overcome the difficulties and disadvantages above described, but which also provide for effective integration of the blower equipment into the system as a whole, including the brushes and the water, detergent and wax supply systems, if desired.

In the preferred embodiments according to the invention, instead of mounting a motor blower unit in the top cross piece of the frame structure, a motor blower unit is mounted near the lower end of at least one of the legs, and preferably motor blower units are mounted toward the bottom of both of the legs of the equipment. A top nozzle is mounted for upward and downward movement on the top portion of the frame structure and ducting is provided in order to deliver air from the motor blower unit or units in the leg or legs to the top nozzle. This enables lowering of the center of gravity of the over-all equipment.

It is particularly advantageous to employ two motor blower units, one located in each leg of the inverted U and to provide side nozzles in addition to the top nozzle, with ducting and control means providing alternatively for delivery of air through the side nozzles and through the top nozzle. By this system it is not only possible to keep the center of gravity low, but in addition it is possible to effectively deliver air not only to the upwardly presented surfaces of the car, but also to the side surfaces. Moreover this arrangement has a further distinctive advantage in that the division of the total air supply between two motor blower units instead of relying upon only one, enables the use of much smaller and therefore much less expensive motor blower units while providing adequate air capacity for operation of the side nozzles.

In a system of the kind just described, it is contemplated that the drying be effected during the course of two passes of the equipment over the washing station, during one such pass all of the air being delivered from both blowers to the top nozzle and during the other of said passes the air from one side blower being delivered to one side nozzle and the air from the other side blower to the other side nozzle.

It is a still further object of the present invention to provide certain novel arrangements for mounting the top nozzle for upward and downward swinging motion particularly adapted to make it possible for the nozzle orifice to remain close to the upwardly presented surfaces of the car being dried, and also to provide for upward nozzle movement to a relatively high position when the nozzle is not in use. At the same time the pivotal or swinging nozzle mounting arrangements are also adapted to maintain minimum over-all dimensions of the equipment so that an installation may be made in a bay of minimum length.

How the foregoing and other objects and advantages are attained will appear more fully from the following description referring to the accompanying drawings in which;

FIG. 2 is a view taken as indicated by the section line 2—2 on FIG. 1;

FIG. 3 is a view similar to FIG. 1 but illustrating an embodiment in which a single motor blower unit is located in one leg of the structure, this view being taken as indicated by the line 3—3 on FIG. 4;

FIG. 4 is a view taken as indicated by the line 4—4 on FIG. 3;

FIG. 5 is a fragmentary top plan view of portions of the equipment shown in FIGS. 3 and 4;

FIG. 6 is a fragmentary view taken in the general manner of FIG. 2, showing a pivotal top nozzle mounting of different form than that shown in FIG. 2;

FIG. 7 is a view of the equipment shown in FIG. 6, but taken substantially as indicated by the line 7—7 on FIG. 6;

FIG. 8 is a fragmentary elevational view of still another form of nozzle mounting;

FIG. 9 is a plan view of the parts shown in FIG. 8;

FIG. 10 is a view similar to FIG. 6 showing still another embodiment;

FIG. 11 is a view similar to FIG. 7 but showing the arrangement of FIG. 10; and

FIG. 12 is a view of the parts shown in FIG. 10, but with the nozzle lowered.

Figure 1:
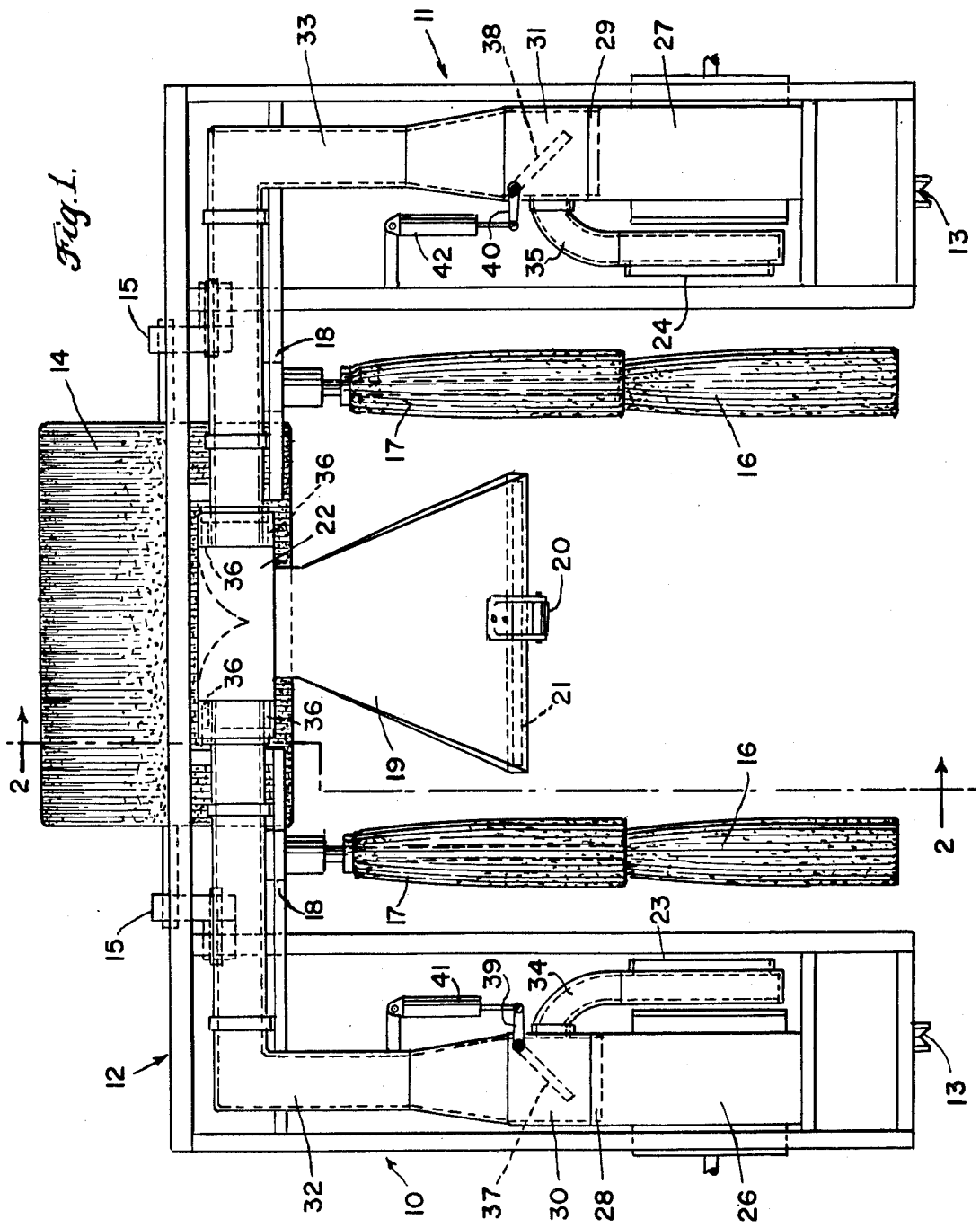
FIG. 1 is an elevational view of an inverted U-shaped car washing equipment constructed according to the present invention and having top and side nozzles and further having two motor blower units, one located in each leg of the frame structure, this Figure being taken as indicated by the line 1—1 on FIG. 2.

Referring first to the embodiments shown in FIGS. 1 and 2, the equipment includes an inverted U-shaped frame structure having legs 10, 11, and a transverse top or beam structure 12, the entire mechanism being adapted to travel on rollers such as indicated at 13.

A top brush 14 is mounted by means of arms 15 in position to be raised and lowered with respect to a car in the washing station.

Multiple side brushes including lower parts 16—16 and upper or window parts 17—17 are mounted on the frame structure preferably by means of supports or arms indicated at 18. The brushes 16 and 17 may be arranged for movement in various senses if desired but the details of the mounting mechanism providing for such movement are not herein disclosed since they form no part of the present invention per se. Mechanism for raising and lowering the top brush may also be provided, but here again such mechanism is not shown as it forms no part of the present invention per se.

As seen in FIGS. 1 and 2, a top air nozzle 19, advantageously having a follower roller 20 of known type is pivotally mounted on the beam structure of the equipment above the car washing station. This nozzle 19 has a discharge orifice indicated at 21 in the form of a slot adapted to deliver air to the upwardly presented surfaces of the car. The hub end 22 of the nozzle is of generally cylindrical form having passages presented in each of two opposite directions, laterally away from each other as will be apparent from FIGS. 1 and 2, for cooperation with ducting to be described.

In addition at each side, on the lower portion of the legs, side nozzles 23 and 24 are provided, these side nozzles each having a vertically elongated orifice such as indicated at 25 in FIG. 2 for discharging the air toward side surfaces of the car in the washing station.

Motor blower units 26 and 27 are respectively mounted in the lower ends of the frame legs 10 and 11, each of these units having its air delivery passage 28 or 29 presented upwardly and delivering into a control valve or box 30 or 31. From the box 30 at one side, ducting 32 extends upwardly through the leg and thence inwardly through the cross frame structure to the region of the hub 22 of the top nozzle. Similarly from box 31 ducting 33 extends upwardly through the leg and thence inwardly through the cross frame structure at the top to the region of the hub of the top nozzle. Ducting 34 extends from the box 30 to the side nozzle 23 at one side, and ducting 35 extends from the box 31 to the side nozzle 24, at the other side.

The connection between the ducting 32 and the ducting 33 with the opposite ends of the nozzle hub 22 desirably comprises an extension of the ducting into the end of the nozzle hub so that the ducting forms a journal on which the nozzle itself may swing or pivot. Suitable rollers such as indicated at 36 in FIG. 2 may be interpositioned between the ends of the ducting and the nozzle hub 22 in order to provide for free swinging motion of the nozzle. Appropriate packing such as felt rings are also desirably introduced in order to prevent air leakage at the junction between the ducts 32 and 33 and the opposite ends of the cylindrical portion of the hub 22 of the top nozzle. The mounting of the nozzle hub provides freedom for upward swinging motion, for instance to the position indicated in dotted lines in FIG. 2. The position of mounting the nozzle hub in relation to the top brush 14 as seen in FIG. 2 is desirable as it permits upward and downward pivotal movements of the brush and nozzle without interference with each other and also aids in maintaining the equipment within minimum clearance limitations.

As best seen in FIG. 1, each of the boxes 30 and 31 is provided with a flap or plate valve, as shown at 37 and 38, each of these valves being pivoted as is indicated and having an actuating arm 39 or 40. Operating cylinders 41 and 42 are provided in order to actuate the valves. In FIG. 1 the valves are shown in a position mid-way between the two limits of the operating range, but it will be understood that in the case of each valve it may either be swung upwardly from the position shown in order to shut off the ducts 32 or 33 or may be swung downwardly from the position shown in order to shut off the ducts 34 or 35. Control is thus provided for alternatively delivering the air from the blowers 26 and 27 either to the respective side nozzles 23 and 24 or in a combined flow to the top nozzle 19.

It will be noted from FIG. 2 that the top nozzle 19 is pivotally mounted upon the frame structure so that even when the top nozzle is raised, it does not project beyond the brushes and therefore does not extend the bay dimension required for installation of the equipment as a whole beyond the requirements for the brushes.

The top nozzle is also arranged in relation to the top brush 14 so that either the brush or the nozzle may be brought downwardly to the proper position for cooperation of the upwardly presented surfaces of the car in the washing station without interference.

The nozzles 23 and 24 are also appropriately positioned so that no interference is encountered with respect to the action of the side brushes.

As above indicated the employment of two motor blower units, as in FIGS. 1 and 2, is highly advantageous from the standpoint of providing adequate air supply for drying virtually all surfaces of a car in the washing station, while at the same time minimizing equipment costs. The blowers may be of relatively small capacity, partly because of the fact that the combined flow of both of them is delivered to the top nozzle in order to supply the required volume of air necessary for effective drying of the top surfaces of the car.

It will be understood that it is preferred to provide equipment for raising and lowering the top nozzle, for instance of the type shown in certain other embodiments described hereinafter, this equipment being omitted from FIGS. 1 and 2 for the sake of simplicity of illustration.

Turning now to the embodiment shown in 3, 4, and 5, it will be seen that here again the equipment comprises an inverted U-shaped frame having legs 10 and 11 and a top beam 12. The brushes here include a top brush 14 as in the first embodiment, but side brushes 43 and 44 are provided on the vertical shafts 45 and 46, with separate window brushes 47 and 48 arranged on horizontal fore-and-aft mounting shafts.

The arrangement of the air drying equipment of the embodiment of FIGS. 3 to 5 differs from that of the first embodiment in several respects, including the fact that no side nozzles are employed, there being only a single top nozzle in this equipment. This top nozzle is indicated at 19a and has a generally cylindrical hub 22a similar to that described above except that it is single ended instead of double ended.

In the embodiment of FIGS. 3 to 5 only a single motor blower unit 49 is employed and this unit is located at the lower end of one of the legs of the inverted U frame. The delivery passage 50 of the unit 49 is presented upwardly and cooperates with the ducting 51 which extends upwardly through the leg and thence laterally through the beam at the top of the frame for cooperation with nozzle hub 22a in a rotating joint which may be similar to that described above in connection with the first embodiment. In order to provide adequate support for the nozzle 19a, a mounting shaft 52 is connected with and extends from the hub 22a in a direction opposite to the ducting 51, this shaft 52 being journaled or provided with bearings as indicated at 53 on an axis coincident with the axis of the joint between the ducting 51 and the nozzle hub 22a.

Shaft 52 carries an actuating arm 54 with which the piston of a piston and cylinder control device 55 cooperates in order to provide for upward and downward swinging movement of the nozzle 19a during the operation or cycling of the equipment.

Turning now to the embodiment illustrated in FIGS. 6 and 7, it is noted that this equipment comprises a pivotal mounting for a top nozzle 19b adapted to be supplied with air from a pair of ducts 32a and 32b in the general pattern provided in the embodiment of FIGS. 1 and 2. Here the nozzle is mounted by means of arms 56 which arms are pivoted on brackets 57 carried by the transverse beam of the frame structure in a position well toward one side of the frame structure, preferably opposite to the mounting of the top brush, so that the arms 56 may be of substantial length without projecting excessively beyond the confines of the frame structure. In this way a very substantial upward and downward swinging motion, i.e., a swinging motion through the range indicated by the full line and dotted line positions in FIGS. 6 and 7 without however causing the nozzle to project appreciably beyond the confines of the frame structure when in the upper position. This provides for maintaining the nozzle orifice very close to the surfaces of the car being dried. Maintenance of the orifice very close to the surface to be dried is an important factor in minimizing the required blower capacity in order to accomplish a given drying action. This arrangement is therefore important in making possible the use of smaller and therefore less expensive motor blower units.

The pivotal motion of the nozzle may be accomplished by means of the piston and cylinder device indicated at 58.

The two ducts 32a and 32b are connected in a junction box 59 which is connected with the nozzle by means of the flexible conduit 60.

In the embodiment of FIGS. 8 and 9 there is also shown a novel mounting arrangement adapted to provide for close following of the top nozzle in relation to the upwardly presented surfaces of the car. Here the nozzle 19c is mounted on fixed structure by means of pairs of pivoted links 61 and 62 so arranged that the free end of the nozzle, i.e., the nozzle orifice will move in a path which is principally vertically extended, thereby providing for close following of the surfaces of the car without necessitating any appreciable swinging motion of the nozzle orifice lengthwise of the car or the bay in which the equipment is installed. In the embodiment of FIGS. 8 and 9 it is contemplated that the air be supplied in the manner indicated in FIGS. 6 and 7, through a flexible duct 60a, preferably fed from a pair of ducts such as indicated at 32a and 32b connected respectively with a pair of motor blower units as in the embodiment of FIGS. 1 and 2. Piston and cylinder device 63 provides for raising and lowering of the nozzle 19c.

The arrangements for nozzle mounting as shown in FIGS. 6 and 7 and in FIGS. 8 and 9 are of importance in facilitating close following of the nozzle orifice in relation to the surface of the car to be dried, and this in turn facilitates the use of smaller motor blower units. This is particularly true where a pair of such motor blower units are utilized as in the embodiments of FIGS. 1 and 2. The arrangement of FIGS. 10, 11 and 12 described below also has this advantage, but the arrangement of FIGS. 10, 11 and 12 has still further advantages as will be pointed out.

In the embodiment of FIGS. 10, 11 and 12 the nozzle 19d is mounted by means of a pair of links 64 which are pivoted to the nozzle preferably toward the base end thereof and which are also pivotally connected with the brackets 65 depending from the transverse structure 12 of the equipment in a position forward of the base end of the nozzle.

The device for raising and lowering the nozzle here includes a cylinder 66 having a piston therein connected with the piston rod 67, the cylinder being pivotally mounted by means of brackets 68, and the piston rod 67 being pivotally connected with the nozzle in a position spaced from the attachment of the links 64 in the direction of the air discharge orifice of the nozzle. With this linkage, motion of a nozzle between positions illustrated in FIGS. 10 and 12 is provided. It will be observed that the air discharge orifice of the nozzle has a large range of motion in the vertical direction, so that the nozzle may be brought down very close to the upwardly presented surfaces of the car, which is of importance for reasons already mentioned hereinabove, while also providing for elevation of the nozzle to a relatively high position when it is not in use. Moreover this freedom for motion is also made possible by the arrangment of FIGS. 10 to 12 while maintaining minimum overall dimension of the equipment in a direction fore-and-aft of the car washing station.

It is contemplated in the arrangement of FIGS. 10 to 12 to use a pair of motor blower units provided toward the bottom of the legs of the U-shaped structure, as in FIG. 1, with ducts extended upwardly and thence inwardly along the top structure 12 as indicated at 32a and 32b, these two ducts being connected with the base end of the nozzle by means of flexible tubing such as shown at 69 and 70. This arrangement readily accommodates the desired nozzle motions. In order to limit and assure the desired motion of the nozzle and the suspending links 64, the pivotal joints of those links with the nozzle and with the bracket 65 may be provided with limiting stops and/or bias springs, so that when the cylinder and piston device 66 – 67 is operated, the desired motions will occur.

The nozzle 19d is desirably provided with one or more yieldingly mounted follower wheels 71 in order to prevent direct contact of the nozzle structure with the surface of the car in the washing station.

In the preferred practice of the invention, particularly in an arrangement such as shown in FIGS. 10 to 12, it is contemplated that the piston and cylinder device 66 – 67 be operated by air or other pneumatic pressure so that the action thereof is yielding. The discharge of a substantial volume of air at appreciable pressure from the nozzle orifice against the surface of the car has a tendency to raise the nozzle, which would decrease the effectiveness of the drying and require larger motor blower units. In order to keep the nozzle close to the car and thus minimize the capacity of the required motor blower units, it is contemplated that some slight pressure be maintained in the cylinder 66, tending to urge the nozzle downwardly. The linkage arrangement of FIGS. 10 to 12 is of advantage since it provides freedom for automatic adjustment of the nozzle in respect to car surfaces under the influence either of the air being delivered from the orifice or under the influence of the action of the yieldingly mounted roller 71.

I claim:

1. Roll-over type car drying equipment comprising a generally horizontally extended frame structure mounted to travel over a car washing station, an air discharge nozzle for directing air downwardly against upwardly presented surfaces of a car in said station, the nozzle having hollow hub parts at least in part of generally cylindrical form extended therefrom in opposite directions and both mounted on the frame structure with their axes generally horizontal and extended transversely of the direction of travel and providing for upward and downward pivotal movement of the nozzle, the equipment also including air supply ducts extended to the nozzle through both of the hub parts of cylindrical form.

2. Equipment of the kind described comprising a generally horizontally extended frame structure mounted to travel over a car washing station, an air discharge nozzle having a discharge aperture toward one end for directing air downwardly against upwardly presented surfaces of a car in said station, said nozzle having a flexible air supply conduit connected with the nozzle toward the other end thereof, and means for suspending the nozzle from the frame structure comprising multiple linkage mechanism comprising a plurality of link devices each pivotally connected at one end with the frame and at its other end to the nozzle and providing for movement of the apertured end of the nozzle with respect to the frame structure in a virtually vertical plane during movement of the link mechanism between extreme positions.

* * * * *